Feb. 25, 1958    A. ROSSET ET AL    2,824,706
HOLDER FOR COILABLE MATERIAL
Filed March 10, 1954    2 Sheets-Sheet 1
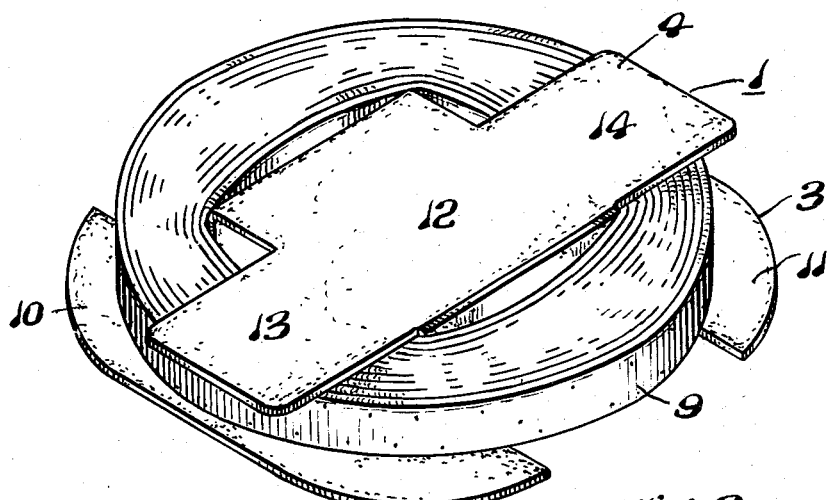
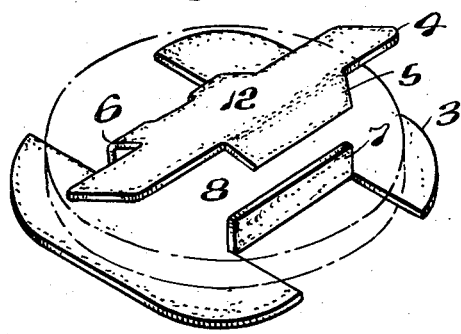
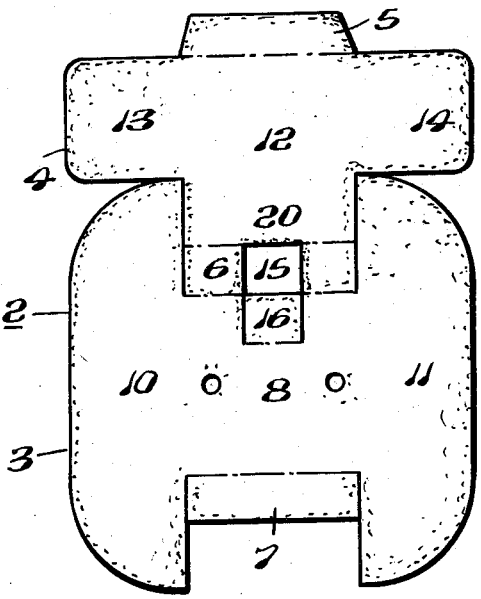
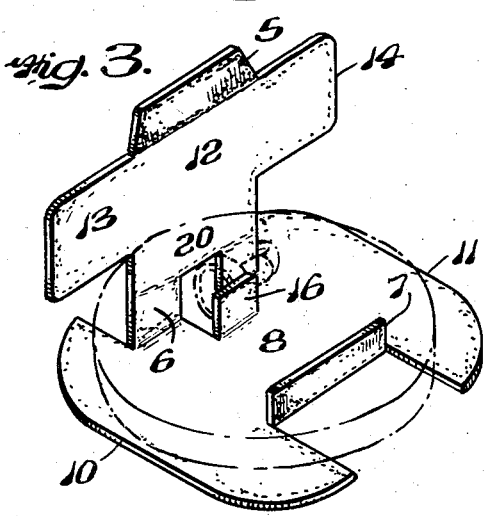
INVENTORS
ADOLPH ROSSET
CHARLES A. STOPPER
BY
THEIR ATTORNEY Feb. 25, 1958   A. ROSSET ET AL   2,824,706
HOLDER FOR COILABLE MATERIAL
Filed March 10, 1954   2 Sheets-Sheet 2
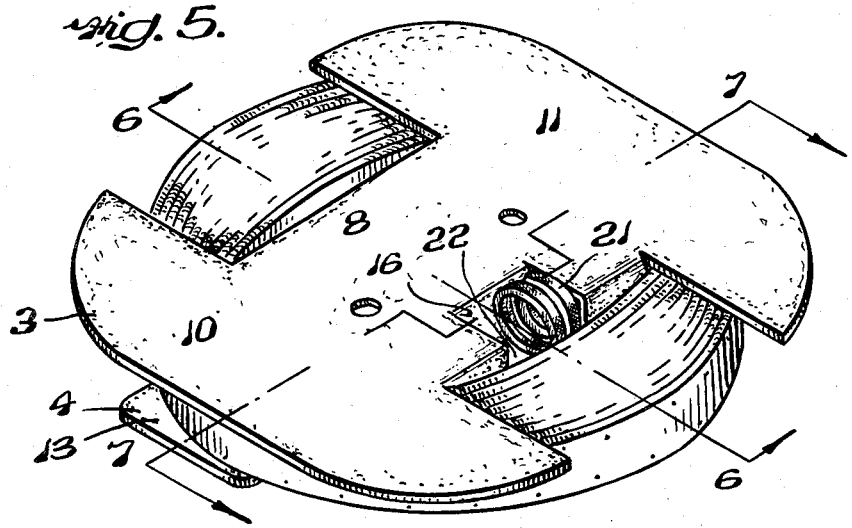
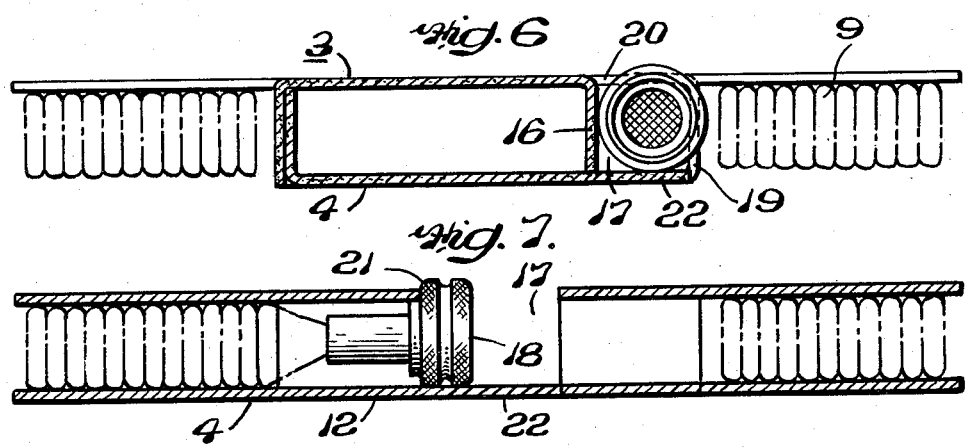
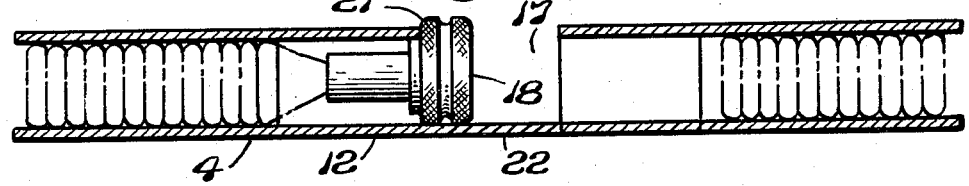
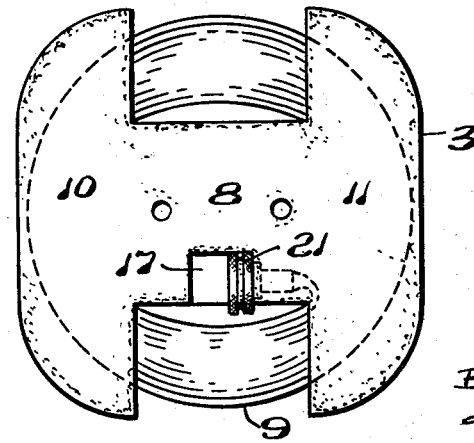
INVENTORS
ADOLPH ROSSET
CHARLES A. STOPPER
BY
THEIR ATTORNEY

United States Patent Office 2,824,706
Patented Feb. 25, 1958

2,824,706

HOLDER FOR COILABLE MATERIAL

Adolph Rosset, Philadelphia, and Charles A. Stopper, Perkiomenville, Pa., assignors to Hancock Manufacturing, Inc., Philadelphia, Pa., a corporation of Pennsylvania Application March 10, 1954, Serial No. 415,344

2 Claims. (Cl. 242—118.7)

Our invention is an improved holder for coilable objects, such as garden hose, which may be formed from a single sheet of cardboard or the like.

Rubber garden hose has been customarily stored on a heavy metal ring which not only had to be of substantial strength but necessarily was of comparatively large size because the heavy walls of the hose took up substantial space and did not lend itself to small diameter coilage. With the introduction of light weight rubber and plastic hose having thin walls, particularly of the soil-soaker type wherein holes are perforated in the side walls of the hose to permit water seepage through the length of the hose, it is no longer necessary or practical to use the large, heavy rings or reels heretofore used.

We have developed a light weight holder which can be formed from a single sheet of cardboard. It can securely grasp one end of the hose and conveniently hold the entire length of hose within its outline thereby providing a small, light weight, inexpensive package.

The single sheet of cardboard can be die-cut so that, when folded and fastened together, it will provide support throughout the entire width of the coiled hose and at the same time permit easy grasp of and removal of the hose from the holder. When the hose is coiled on the cardboard holder it provides a neat appearing package having no protrusions which can cut or harm the handler.

The primary object of our invention is to provide a light, compact, inexpensive holder on which to coil hose or the like and which can be readily collapsed for storage when not in use.

It is a further object of our invention to provide a holder which, while providing adequate support surface for the enclosure of a hose coiled thereon, also provides substantial areas in which the hose is exposed and by which it can be readily grasped.

It is also an object of our invention to provide a holder which presents an attractive appearance for self-display purposes and at the same time permits visual inspection on the goods by the prospective purchaser.

The principles and characteristic features of our invention and the manner of making and constructing and using our improved holder will further appear in the accompanying drawings and the following description explaining the best modes in which we have contemplated using such principles.

In the drawings—

Fig. 1 is a perspective view of our improved holder on which a section of light weight hose has been coiled;

Fig. 2 is a plan view of the blank from which the holder shown in Fig. 1 is formed;

Fig. 3 is a perspective view of the blank shown in Fig. 2 with the back portion thereof folded into upright position;

Fig. 4 is a perspective view similar to Fig. 3 with the back portion folded over for sealing;

Fig. 5 is a perspective view of the completed holder with hose wound thereon but in a position which is inverted to that shown in Fig. 1;

Fig. 6 is a cross-sectional view of the holder and hose taken along the lines 6—6 of Fig. 5;

Fig. 7 is a cross-sectional view of the holder taken along the line 7—7 of Fig. 5; and Fig. 8 is a top plan view of the holder with hose wound thereon.

Our holder 1 is formed from a blank 2 of cardboard or the like which is cut as to be formable into a top member 3, a bottom member 4, flap members 5 and 7, and a connecting member 6.

The top member 3 has a central section 8, about which a hose 9 may be coiled, and a pair of ears 10 and 11 which extend in parallel relationship on either side of the central section 8 and extend substantially beyond said central section 8 to provide support for the hose 9, as may be seen in Fig. 1.

The bottom member 4 has a central section 12 and a pair of ears 13 and 14 extending at right angles therefrom so as to overlay the central portion of the ears 10 and 11 when the holder is in completed form.

Flaps 5 and 7 extend from opposite ends of the central sections 12 and 8 respectively and are fastened together to form a supporting and spacing member on one side of the holder. The other side of the holder is supported and spaced by the connecting member 6 which extends between the central sections 12 and 8 on either side of a cutout 15. A tab 16 similar in dimension to the cutout 15 is cut from the central section 8 but is hinged thereto. In erected position the tab 16 provides additional means for spacing and supporting the top and bottom members 3 and 4. The bond between flaps 5 and 7 does not interfere with the ready collapse of the holder so long as the tab 16 is not in erected position.

A recess 17 is provided on one side of the holder to engage the coupler end 18 of the hose 9 so as to prevent the disengagement or slipping of the coupler end 18 while the hose 9 is being wound about the holder. That is to say, the coupler end 18 is placed in the recess 17, which is bounded by the tab 16, the edges 19 and 20 of the connecting member 6 and central section 8 respectively, and the bottom support 22, being the portion of the central section 12 immediately opposite the cutout 15, so that the rim 21 of the coupler end 18 is engaged by the edges 19 and 20 and is biased by the tab 16 toward engagement with said edges. The positioning of the coupler end 18 in the recess 17 and in engagement with the tab 16 also prevents the tab 16 from moving away from its erected position and thereby insures the rigidity and proper spacing of the top and bottom members 3 and 4 when the hose is being wound upon the holder.

The holder may be readily collapsed whenever the hose and coupler are removed therefrom by merely turning the tab 16 toward parallel relationship with the central section 8, whereupon the weight of the uppermost member tends to collapse it toward the bottom member. In collapsed position the holder occupies a minimum of space and can be readily stored.

The spacing of the ears 10 and 11 not only makes an economical use of the support material but also provides areas in which the hose is exposed to view and whereat it can be inspected, and additionally provides ready means for grasping the hose thereby assisting in the ready coiling or uncoiling of the hose about the holder.

It is to be understood that while we have referred only to the use of cardboard, we anticipate that other light weight, relatively strong material, having flexible characteristics, such as certain types of plastic material may be used in place of the cardboard and we, therefore, do not limit ourselves to the use of cardboard only.

Having described our invention, we claim:

1. A collapsible holder for coilable objects formed from a single blank, said blank comprising a bottom member including a center section and a pair of ears extending therefrom of a width no greater than the width of said center section, a top member including a central section and a pair of ears extending therefrom and having their longer axes at right angles with the common axis of said first mentioned ears, the longer dimension of said last mentioned ears being substantially greater than the width of said central section, a pair of connecting means inboard of said ears flexibly joining said top member with said bottom member, an aperture in one of said connecting means for receiving one end of said coilable objects, and a tab cut from and hinged to said top member and having one edge thereof forming one of the boundaries of said aperture when in extended position and having said edge engageable with said bottom member when in folded position for spacing and supporting said top member away from said bottom member, and a surface of said tab biasing said end toward said aperture when in folded position.

2. A collapsible holder for coilable objects formed from a single blank, said blank comprising a top member including ears protruding therefrom, a bottom member including ears at right angles to and in juxtaposition with said first mentioned ears, a pair of connecting members within the outlines of said ears flexibly joining said top and bottom members, an aperture in one of said connecting members for the reception of one end of said coilable objects, and a tab hinged to said top member for biasing said end of said coilable objects toward said aperture when said tab is in erected position and for spacing and supporting said top member away from said bottom member.

References Cited in the file of this patent

UNITED STATES PATENTS

| | | |
|---|---|---|
| 943,202 | Struss | Dec. 14, 1909 |
| 1,772,102 | Lewis | Aug. 5, 1930 |
| 2,368,594 | Hawkins | Jan. 30, 1945 |
| 2,369,958 | Fox | Feb. 20, 1945 |
| 2,426,865 | Fink | Sept. 2, 1947 |
| 2,652,922 | Schweich | Sept. 22, 1953 |

FOREIGN PATENTS

| | | |
|---|---|---|
| 368,741 | Great Britain | Mar. 9, 1932 |